W. R. OSBORNE.
PIPE PULLING DEVICE.
APPLICATION FILED JUNE 11, 1917.
1,241,430.
Patented Sept. 25, 1917.
2 SHEETS—SHEET 1.
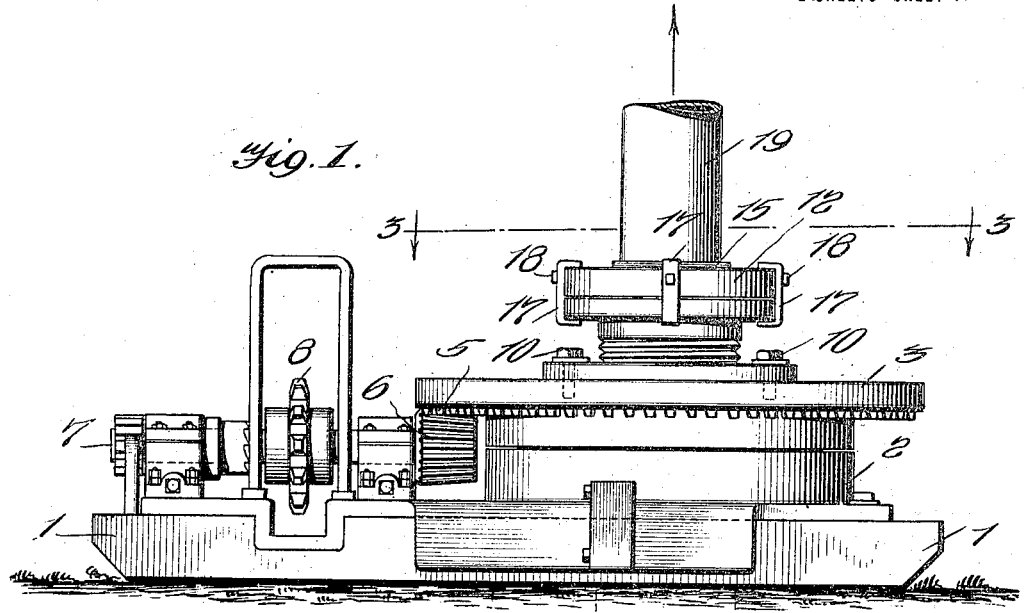
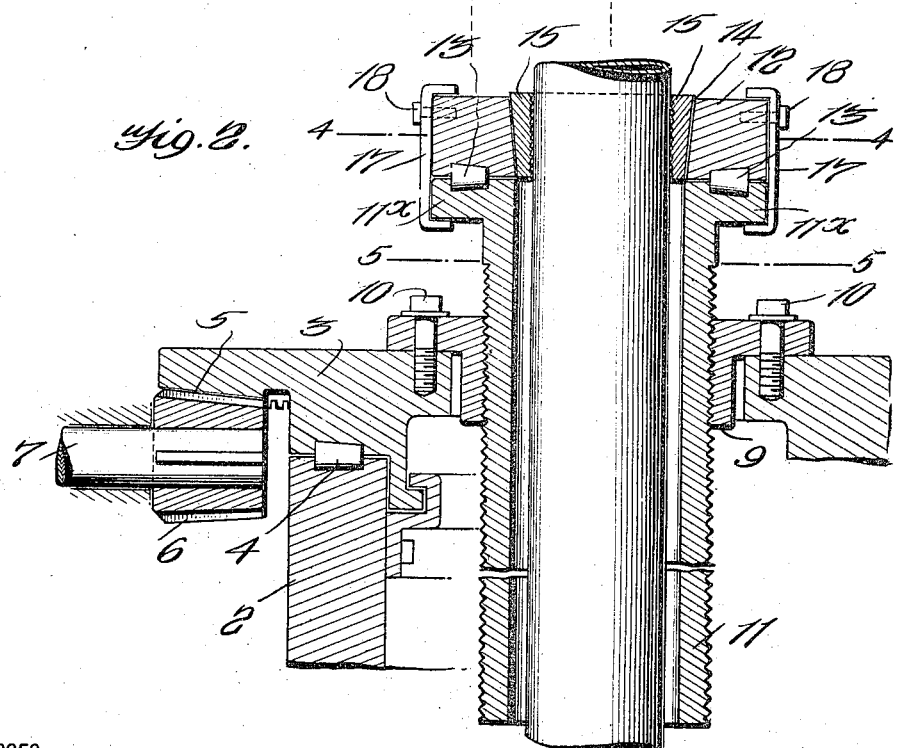
WITNESSES
INVENTOR
WILLIAM R. OSBORNE,
BY
ATTORNEYS W. R. OSBORNE.
PIPE PULLING DEVICE.
APPLICATION FILED JUNE 11, 1917.
1,241,430.
Patented Sept. 25, 1917.
2 SHEETS—SHEET 2.
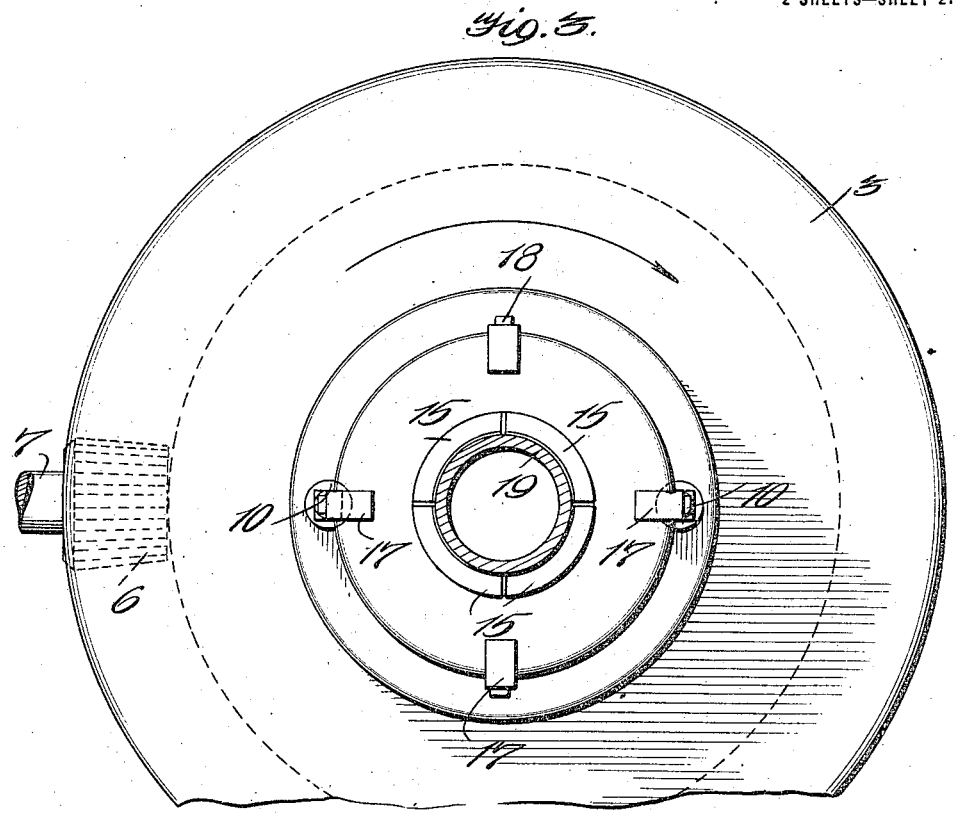
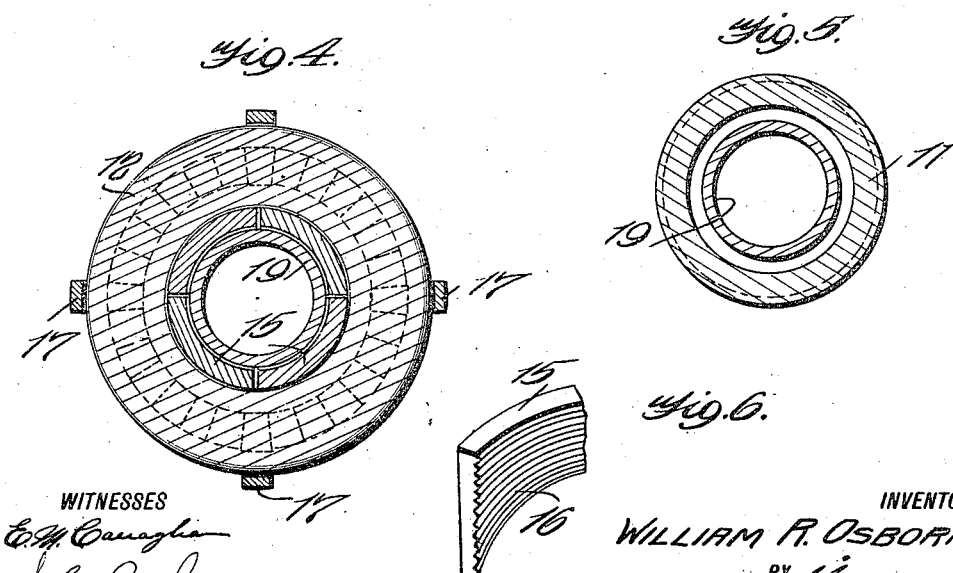
WITNESSES
INVENTOR
WILLIAM R. OSBORNE,
BY
ATTORNEYS

UNITED STATES PATENT OFFICE.

WILLIAM R. OSBORNE, OF ELECTRA, TEXAS.

PIPE-PULLING DEVICE.

1,241,430.

Specification of Letters Patent.  Patented Sept. 25, 1917.

Application filed June 11, 1917.  Serial No. 173,970.

*To all whom it may concern:*

Be it known that I, WILLIAM R. OSBORNE, a citizen of the United States, and a resident of Electra, in the county of Wichita and State of Texas, have invented a new and useful Improvement in Pipe-Pulling Devices, of which the following is a specification.

My invention relates to improvements in pipe pulling devices and it consists in the combinations, constructions and arrangements herein described and claimed.

An object of my invention is to provide a pipe pulling device which may be used for pulling pipes from oil wells, Artesian wells, etc., without the use of derricks.

A further object of my invention is to provide a pipe pulling device which will obviate the danger of pulling down a derrick but which nevertheless is powerful enough to extract a pipe from any ordinary well.

A further object of my invention is to provide a power device for pulling pipes which will exert a straight pull and which will not twist the pipe.

A further object of my invention is to provide a device of the type described having a portion which firmly grips the pipe, and another portion which revolves on anti-friction bearings against the first-named portion, these two portions being so held together as to permit the revolution of one with respect to the other, while preventing the separation of the two portions and the loss of the anti-friction bearings, should the pipe suddenly break.

Other objects and advantages will appear in the following specification and the novel features of the invention will be particularly pointed out in the appended claims.

My invention is illustrated in the accompanying drawings, forming part of this application, in which—

Figure 1 is a side view of the pipe pulling device,

Fig. 2 is a section through a portion of the mechanism,

Fig. 3 is a section along the line 3—3 of Fig. 1,

Fig. 4 is a section along the line 4—4 of Fig. 2,

Fig. 5 is a section along the line 5—5 of Fig. 2,

Fig. 6 is a perspective view of a portion of one of the gripping members.

In carrying out my invention I provide a rotor consisting of a base 1 supporting a cylinder 2, at the upper end of which is journaled a table 3, ball bearings 4 being disposed between the cylinder and the table. The edge of the table has a bevel gear 5 which is arranged to mesh with a gear 6 on a drive shaft 7. The latter bears a sprocket chain 8 by means of which the shaft 7 is rotated. Secured to the central portion of the table is an interiorly threaded sleeve or nut 9. This nut is held to the table by means of bolts 10.

A threaded sleeve 11 is arranged to engage the thread of the nut 9, this sleeve bearing at its upper end a head $11^x$. Arranged to rest on the head $11^x$ is a circular plate 12, anti-friction rollers 13 being disposed between the plate 12 and the head $11^x$. This plate 12 is an annular plate having a tapered opening 14 at its center. Wedges 15, like that shown in Fig. 6, are provided, these wedges having teeth 16 on their inner sides and being preferably curved in the shape of a quadrant. Holding members 17 are disposed on the outer sides of the contiguous members $11^x$ and 12, these holding members being secured to the plate 12 by bolts 18, or in any other suitable manner.

From the foregoing description of the various parts of the device, the operation thereof may be readily understood.

The annular plate 12 is placed over the end of the pipe 19 and the holding members 17 are secured in position. The roller bearings 13 permit the revolution of the head $11^x$ with respect to the collar 12. The wedges 15 are placed around the pipe and are wedged into the tapered openings 14 in the collar 12, thus securely fastening the pipe to the collar or plate.

Now when power is applied to the shaft 7, the table bearing the nut 9 will revolve and this will cause the sleeve 11 to rise. The sleeve will revolve but the collar 12 will tend merely to force the pipe upwardly, thus lifting it from the bore or well. Should the pipe break suddenly while it is being pulled, the provision of the retaining members 17 will prevent the collar 12 from flying off and thus loosening the roller bearings.

I claim:—

1. A pipe pulling device comprising a sleeve threaded on its exterior portion and having a head at its upper end, a nut arranged to engage a sleeve, a table having an opening arranged to receive a portion of the nut, means for securing the nut to the table, means for rotating the table to cause the rotation of the nut, a collar arranged to surround the pipe, anti-friction bearings between said collar and said head, wedges between said collar and said pipe, and means carried by the collar for holding the collar in position with respect to the head, if the pipe should break.

2. A pipe pulling device comprising a sleeve threaded on its exterior portion and having a head at its upper end, a nut arranged to engage the sleeve, a table having an opening arranged to receive a portion of the nut, means for securing the nut to the table, means for rotating the table to cause the rotation of the nut, a collar arranged to surround the pipe, anti-friction bearings between said collar and said head, wedges between said collar and said pipe, and means carried by the collar for holding the collar in position with respect to the head if the pipe should break, said means comprising a plurality of U-shaped retaining devices arranged to fit over the collar and the head, said retaining devices being secured to the collar.

WILLIAM R. OSBORNE.

Copies of this patent may be obtained for five cents each, by addressing the "Commissioner of Patents, Washington, D. C."